United States Patent [19]
Goh

[11] Patent Number: 5,754,570
[45] Date of Patent: May 19, 1998

[54] CO-DOPED OPTICAL MATERIAL EMITTING VISIBLE/IR LIGHT

[75] Inventor: Seng Chow Goh, Glen Waverley, Australia

[73] Assignee: Telstra Corporation Limited, Melbourne, Australia

[21] Appl. No.: 556,913

[22] PCT Filed: May 18, 1994

[86] PCT No.: PCT/AU94/00253

§ 371 Date: Feb. 20, 1996

§ 102(e) Date: Feb. 20, 1996

[87] PCT Pub. No.: WO94/26674

PCT Pub. Date: Nov. 24, 1994

[30] Foreign Application Priority Data

May 19, 1993 [AU] Australia ............... PL 8847

[51] Int. Cl.⁶ .............. H01S 3/30; H01S 3/00; G02B 6/00
[52] U.S. Cl. .............. 372/6; 372/39; 372/40; 372/68; 359/341; 359/343; 385/123; 385/141
[58] Field of Search .............. 372/6, 39, 40, 372/43, 50, 68; 359/341, 343; 385/141, 127, 123, 37

[56] References Cited

U.S. PATENT DOCUMENTS

| | | |
|---|---|---|
| 4,815,079 | 3/1989 | Snitzer et al. ............... 372/6 |
| 5,287,217 | 2/1994 | Cockroft ............... 359/341 |
| 5,366,937 | 11/1994 | Schneider et al. ............... 601/40 |

FOREIGN PATENT DOCUMENTS

| | | | |
|---|---|---|---|
| 0 450 677 A1 | 10/1991 | European Pat. Off. ............ 359/341 X |
| 0 462 613 A2 | 12/1991 | European Pat. Off. ............ 359/341 X |
| 0 533 324 A2 | 3/1993 | European Pat. Off. ............ 359/341 X |
| 0 534 750 A1 | 3/1993 | European Pat. Off. ............ 359/341 X |
| 40 28 821 A1 | 3/1992 | Germany ............ 359/341 X |

OTHER PUBLICATIONS

Chemical Abstracts, vol. 1129, No. 20, issued 15 Nov. 1993 (Cincinnati, Ohio, USA) p. 720, col. 1, abstract No. 119:21340z.

Ceramic Abstracts, vol. 72, Nos. 1–2, issued Jan.–Feb. 1993 (Westerville, Ohio, USA), K. Bennett et al., "$Tm^{3+}$–$Yb^{3+}$ Upconversion Laser At 0.48 μm.", p. 35, col. 2, abstract No. 72–00676A, Ceramic Transactions, vol. 28: Solid–State Optical Materials (Proceedings Of A Symposium At The 93rd Annual Meeting Of The Americal Ceramic Society, Cincinnati, Ohio, 29 Apr. –3 May 1991).

Journal Of Applied Physics, vol. 73, No. 3, 1 Feb. 1993 (American Institute of Physics, New York, USA), G. Tohmon et al., "Energy Transfer In Tm:Eu Codoped Fluorozirconate Fiber," pp. 1528–1530.

Applied Physics Letters, vol. 62, No. 9, 1 Mar. 1993 (American Institute of Physics, New York, USA)l, G. Özen et al., "Enhanced $Tm^{3+}$ blue emission in Tm, Yb, Co–Doped Fluorophosphate Glasses Due To Back Energy Transfer Processes," pp. 928–930.

Patent Abstracts of Japan, P–1531, p. 76, JP 4–358130 A2 (Sumitomo Electric Inc. Ltd.) Dec. 1992.

(List continued on next page.)

*Primary Examiner*—Brian Healy
*Attorney, Agent, or Firm*—Wolf, Greenfield & Sacks, P.C.

[57] ABSTRACT

An optical material comprises a host matrix (e.g. fluorozirconate glass such as ZBLANP) doped with an optical atom pair or ion pair, each pair comprising a sensitizer (e.g. $Nd^{3+}$) and an activator (e.g. $Pr^{3+}$). The sensitizer is capable of absorbing optical excitation energy of a single wavelength (e.g. in the 800 nm region of GaAlAs diode laser) and transferring this optical excitation energy to the activator. This causes emission of visible and/or infrared light when the activator relaxes back into any of its lower energy states. Optical devices containing the optical material, and methods for generating visible and/or infrared light involving the optical material are also disclosed.

21 Claims, 4 Drawing Sheets

OTHER PUBLICATIONS

Journal of Chemical Physics, vol. 77, No. 6, 15 Sep. 1982 (American Institute of Physics, New York USA), Redd, B.R. et al., "Energy Transfer In $LaF_3:R^{3+}, Pr^{3+}$ (where R=Nd, Dy)", pp. 2862–2869.

R.G. Smart et al., "Cw Room Temperature Upconversion Lasting At Blue, Green, and Red Wavelengths In Infrared Pumped $Pr^{3+}$–Doped Flouride Fibre," Electron. Lett. 27, 1307–1308 (1991).

W. Lenth et al., "Exicitation Mechanisms for Upconversion Lasers," Journal of Luminescence, 45, 346–350 (1990).

F.E. Auzel, "Materials And Devices Using Double–Pumped Phosphors With Energy Transfer," Proceedings Of The IEEE, vol. 61, No.6, Jun. 1973.

F.E. Auzel, "Upconversion Processes In Coupled Ion Systems," Journal of Luminescence, 45, 341–345 (1990).

CO-DOPED OPTICAL MATERIAL EMITTING VISIBLE/IR LIGHT

The invention relates to optical materials and methods and apparatus involving them. More specifically, the invention is concerned with optical materials capable of emitting visible and/or infrared light.

The process of resonant energy transfer between two atoms or ions which may be of a different species is known. A prerequisite for this process to occur is the existence of closely matched energy levels within the interacting atoms or ions.

The process of upconversion involves the absorption of two or more low energy infrared photons by an optically active atom or ion with the subsequent emission of a single high energy visible photon The upconversion process is particularly prevalent in rare-earth metal ions such as $Er^{3+}$, $Ho^{3+}$, $Nd^{3+}$, $Pr^{3+}$, $Sm^{3+}$ and $Tm^{3+}$, whose energy levels exhibit equally spaced step-like structures.

The upconversion process has been employed as an excitation method in rare-earth doped glass in the form of fibre or crystal lasers. In contrast, the resonant energy transfer process has been used in a completely different situation, such as the gaseous HeNe laser. In the HeNe laser, the He atoms are first electronically excited in a glow discharge. Subsequently, a resonant energy transfer occurs between the exited He atoms and the Ne atoms in close proximity. As a result, the Ne atoms end up in an excited state suitable for the ensuing lasing.

Continuous-wave room temperature upconversion lasing has been demonstrated in a $Pr^{3+}$-doped fluoride fibre at blue, green and red wavelengths using infrared excitation sources. Visible lasing has also been achieved with several other rare-earth dopants such as $Er^{3+}$, $Ho^{3+}$, $Nd^{3+}$ and $Tm^{3+}$, embedded mainly in fluoride glass fibres and fluoride crystals.

However, the excitation methods employed in such lasers are very awkward, for example, two different excitation wavelengths, 835 and 1010 nm are required in the $Pr^{3+}$-doped fluoride fibre laser, and in the case of the $Tm^{3+}$-doped fluoride fibre blue laser, a very uncommon 1120 nm excitation source is required. On the other hand, crystalline upconversion lasers are typically operated at cryogenic temperatures.

The ion pair $Nd^{3+}$—$Pr^{3+}$ has been used previously in a phosphate glass host for the enhancement of 1.3 μm optical fibre amplifier performance. However, in that particular case, upconversion will be detrimental to the operation of 1.3 μm amplification or lasing.

A requirement accordingly exists to at least minimise the awkward excitation requirements in existing upconversion lasers by using only a see wavelength excitation. This will then lead to a compact and low cost design for a visible light source, especially in the blue wavelength region, and operating at room temperature.

We have now found that this requirement can be achieved by combining the two processes of resonant energy transfer and upconversion.

According to one aspect of the present invention there is provided an optical material capable of emitting visible and/or infrared light which comprises a host matrix doped with an optical atom pair or ion pair, each pair comprising a sensitiser and an activator, said sensitiser being capable of absorbing optical excitation energy of a single wavelength and transferring this optical excitation energy to said activator so as to cause the emission of visible and/or infrared light when the activator relaxes back into any of its lower energy states.

The host matrix may be selected from any matrix capable of being doped with the optically active atom or ion pair, provided that the upconversion and resonant energy transfer process between the sensitiser and activator can occur. Preferably, the host matrix is a glass. The glass may be a fluoride-based glass such as heavy-metal fluoride or fluorozirconate glass; an oxide-based glass such as phosphate or silica glass; or a chalcogenide glass. Preferably, the host matrix is a fluorozirconate glass. A particularly preferred fluorozirconate glass is ZBLANP due to its high stability as a glass, its high optical quality and transparency and its ease of fabrication and handling. ZBLANP has the following composition:

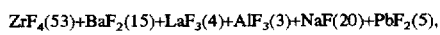

$ZrF_4(53)+BaF_2(15)+LaF_3(4)+AlF_3(3)+NaF(20)+PbF_2(5)$, wherein the numbers in brackets are in mol %. The $LaF_3$ component may be entirely substituted by any rare-earth dopant up to the maximum of 4 mol %. The refractive index of the material may also be tailored by adjusting the ratio of $BaF_2$ and $PbF_2$ to each other.

The optical atom or ion pair is preferably selected from any suitable pair of rare-earth metal ions, such as, for example $Nd^{3+}$—$Pr^{3+}$, $Nd^{3+}$—$Sm^{3+}$ and $Nd^{3+}$—$Tm^{3+}$. In each of these rare-earth metal ion pairs, $Nd^{3+}$ functions as the sensitiser.

The sensitiser and activator may be present in any suitable ratio, typically in the range 0.5:1 to 20:1. When the optical ion pair is $Nd^{3+}$—$Pr^{3+}$, light emissions are observed for a range of $Nd^{3+}$ to $Pr^{3+}$ ratios from about 0.5:1 to 20:1, with the concentration of $Pr^{3+}$ in the host matrix ranging from 0.05 mol % to 0.5 mol %. The ratio of sensitiser to activator is preferably 1:1.

The optical material of the present invention may be used in optical devices such as, for example a compact, low cost, visible colour light source, particularly a blue laser. Applications for such a device can be found in large scale colour printing processes replacing existing gaseous blue lasers, in office laser printers, optical disc data storage and retrieval systems, and various commercial and entertainment displays.

According to another aspect of the present invention there is provided an optical device consisting of or comprising the optical material defined above. Such devices include a visible light source, particularly a blue laser. The invention also includes laser apparatus comprising the optical material defined above and optionally means for generating and directing optical excitation energy of a single wavelength to said material.

The optical material of the present invention may also be used in the production of an optical waveguide or an optical fibre. Trhe optical fibre may be used in optical fibre amplifiers.

According to a further aspect of the present invention there is provided an optical waveguide or an optical fibre comprising the optical material defined above.

Typically, the optical fibre will consist of a core and a sheath which is composed of a material having a lower refractive index than the core. The core is composed of the optical material and the sheath may be composed of a cladding material, such as, for example a glass having the following composition:

$ZrF_4(53)+BaF_2(20)+LaF_3(4)+AlF_3(3)+NaF(20)$ wherein the numbers in brackets are in mol %.

According to a still further aspect of the present invention there is provided a method for generating visible and/or infrared light which comprises subjecting the optical material defined above to optical excitation energy of a single wavelength so that the excitation energy is absorbed by the sensitiser and then transferred to the activator so as to cause the emission of visible and/or infrared light when the activator relaxes back into any of its lower energy states.

According to an even further aspect of the present invention there is provided an apparatus for generating visible and/or infrared light which comprises the optical material defined above and means for generating and directing optical excitation energy of a single wavelength to said material.

The wavelength of the optical excitation energy is preferably in the 0.8 μm region where high power, highly reliable and low cost GaAlAs diode-lasers are widely available.

By way of example only, the method of the present invention will further be described and indicated by reference to the use of the optical ion pair $Nd^{3+}$—$Pr^{3+}$.

Reference is made to the accompanying drawing in which:

FIG. 1 is an energy diagram for the ion pair $Nd^{3+}$—$Pr^{3+}$.

The $Nd^{3+}$ ion is the sensitizer and the $Pr^{3+}$ ion is the activator in the optical ion pair $Nd^{3+}$—$Pr^{3+}$. As illustrated in FIG. 1, an infrared photon of around 0.8 μm wavelength excites the $Nd^{3+}$ ion into the $^4F_{5/2}$ state which rapidly thermalizes into the long-lived $^4F_{3/2}$ state. A further excitation into the $^2D_{5/2}$ state is achieved with the absorption of a second 0.8 μm photon from the intermediate state $^4F_{3/2}$. This is a typical example of the upconversion process in an ion. Subsequently, de-excitation from the $^2D_{5/2}$ state occurs through photon-assisted non-radiative transitions to the venous lower excited states. Among the lower excited states of the $Nd^{3+}$ ion, the $^4G_{11/2}$ and the $^4G_{9/2}$ states are in close resonant energy with the $^1I_6$ and $^3P_1$ states of the $Pr^{3+}$ ion. Resonant energy transfer will then occur between interacting $Nd^{3+}$ and $Pr^{3+}$ ions resulting in highly excited $Pr^{3+}$ in the $^3P_0$, $^3P_1$ and $^1I_6$ states. Due to the large energy gaps between these excited states and the lower energy states including the ground state, de-excitation occurs through radiative transitions, producing the characteristic blue, green, orange and red emissions of the $Pr^{3+}$ ion. These are quite distinct emissions from those of $Nd^{3+}$.

The characteristic emissions of $Pr^{3+}$ have been observed in $Nd^{3+}$—$Pr^{3+}$ co-doped ZBLANP glass samples when excited by a range of wavelengths around 0.8 μm. Since a singly-doped $Pr^{3+}$-ZBLANP sample does not absorb 0.8 μm light to any significant extent, and therefore does not produce any visible emissions, it has been demonstrated experimentally that the upconversion followed by resonant energy transfer process has indeed taken place in the example of a $Nd^{3+}$—$Pr^{3+}$ co-doped ZBLANP glass.

The invention is further described with reference to the following Example, which is not to be construed as limiting the invention in any way.

EXAMPLE

Reference is made to the accompanying drawings in which.

(i) Sample preparation (a) Bulk glass

Figure 1:
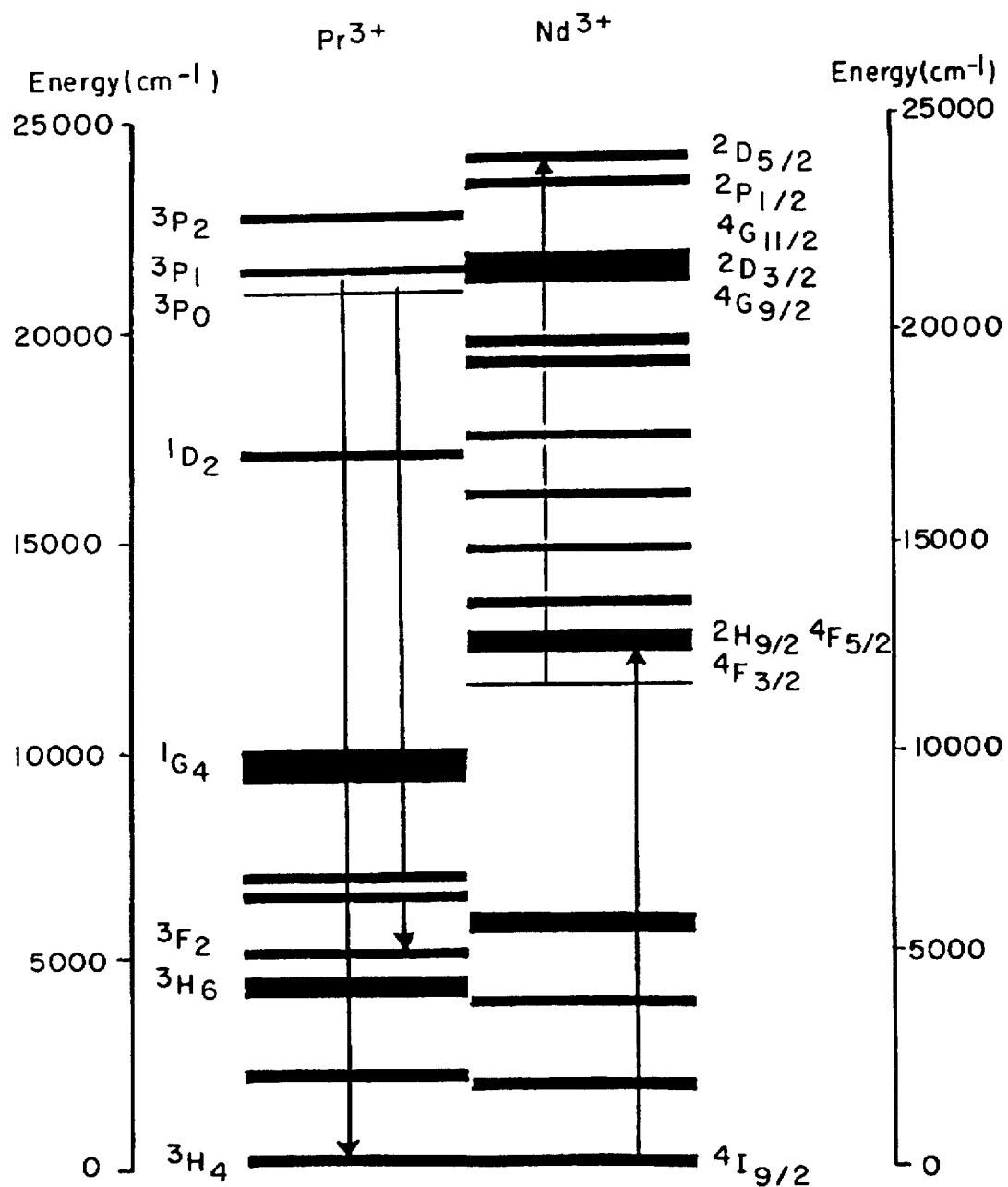
FIG. 1 is an energy diagram for the ion pair $Nd^{3+}$—$Pr^{3+}$.

Bulk glass samples were prepared by weight the appropriate amounts of the various "fibre grade" fluoride compounds having the following composition:

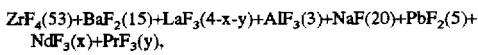

$ZrF_4(53)+BaF_2(15)+LaF_3(4-x-y)+AlF_3(3)+NaF(20)+PbF_2(5)+NdF_3(x)+PrF_3(y)$, wherein x is about 0.8 mol % and y is about 0.2 mol % to make up a total of 20 grams. The fluoride compounds were then melted in a carbon crucible placed in an induction furnace at about 850° C. over a minimum period of 6 hours.

The molten glass remaining in the carbon crucible, was rapidly quenched by placing the crucible in a tight-fit holder machined into a temperature controlled brass block. The glass was annealed at about 265° C. for one hour before it was allowed to cool to room temperature. The resulting disc shape glass sample was then cut and polished into a slab with a typical dimension of 10×5×5 mm for lasing experiments.

(b) Optical fibre waveguide

The fabrication of an optical fibre waveguide consists essentially of to steps:

(i) the preparation of a preform; and (ii) the drawing of an optical fibre from the preform.

To prepare a preform, the bulk glass composition described above was used as the core material. In addition, a lower refractive index undoped glass is required as the cladding material. This cladding material has the basic composition:

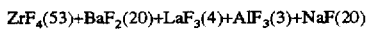

$ZrF_4(53)+BaF_2(20)+LaF_3(4)+AlF_3(3)+NaF(20)$ all in mol %. Typically, a 20 grams batch of core material and a 44 grams batch of cladding material are prepared and melted in separate carbon crucibles at the same time in an induction furnace at about 850° C. for about 6 hours.

The next step in the preform preparation was to employ a drain-casting method to turn the molten glass into a preform. In this dry casting method, the molten cladding was first poured into a temperature controlled cylindrical brass mould which was fitted with a sliding shutter for draining part of the molten glass from the bottom of the mould. The shutter was opened shortly after the molten core material had been poured on top of the cladding material already in the mould. The draining of the unsolidified portion of the cladding material created a partial vacuum which facilitated the flow of core material into the central region of the solidifying cladding material. A preform of 8 mm outer diameter and about 150 mm long was thus made. After annealing inside the mould at about 265° C. for an hour and allowing to cool to room temperature, the preform was ready to be drawn into an optical fibre.

Optical fibre drawing from a preform is a well understood and well developed technology. It will not therefore be described in detail herein. It is sufficient to mention that both single mode and multimode fluoride fibres have been made which are suitable for light emission applications.

(ii) Device construction (a) Bulk glass

Figure 2:
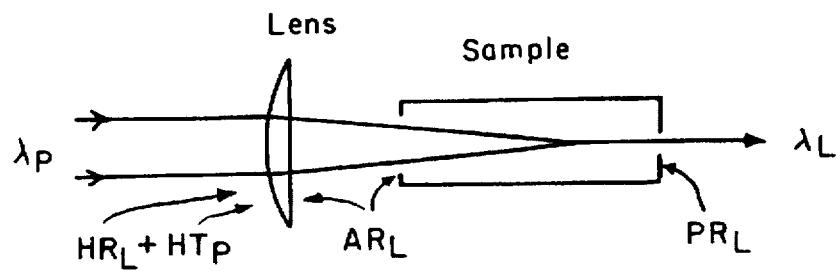
FIG. 2 shows the device construction wherein $\lambda_p$—excitation wavelength, $\lambda_L$—lasing wavelength, $HR_L$—high reflection coating at $\lambda_L$, $HT_p$—high transmission coating at $\lambda_p$, $AR_L$—anti-reflection coating at $\lambda_L$ and $PR_L$—partial reflection coating at $\lambda_L$.

A bulk glass sample, either rod-shape or in a slab, can be employed in a conventional end-pumped laser resonator such as illustrated in FIG. 2 for lasing applications.

(b) Stretched preform

A stretched preform is the product of the intermediate stage of the fibre drawing process. Its larger dimension, typically between 1 and 2 mm in diameter, compared to an optical fibre, enables it to be used in a conventional laser resonator for bulk sample, yet retainng its wave-guiding properties. Since the dopants are concentrated in the core region, much lower excitation power is needed for lasing compared to a bulk sample. Cooling requirements are also less stringent for a stretched preform.

(c) Optical fibre waveguide

Figure 3:
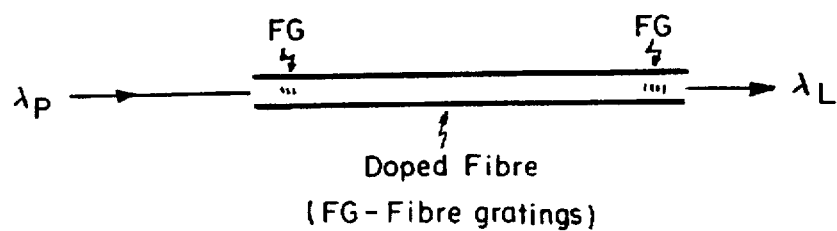
FIG. 3 shows the optical fibre waveguide herein $\lambda_p$—pump wavelength and $\lambda_L$—lasing wavelength.

The construction of a fibre laser is a straight forward when suitable wavelength selective reflectors, such as fibre gratings, are available. In this case, an in-line configuration such as that shown in FIG. 3 can be adopted (iii) Experiment A series of experiments were conducted to investigate the excitation mechanism and the light emission characteristics of the co-doped fluoride glass materials.

Figure 4:
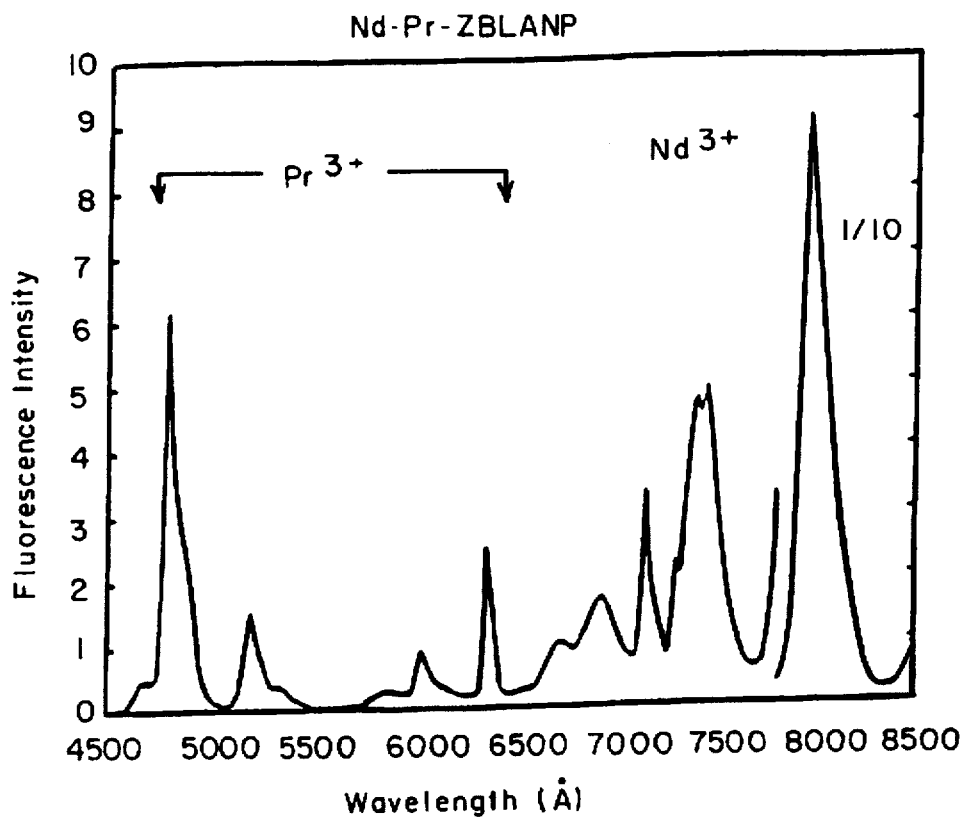
FIG. 4 shows the light emission spectrum of $Nd^{3+}$—$Pr^{3+}$ co-doped ZBLANP glass excited with 796 nm photons.

FIG. 4 shows a typical light emission spectrum of $Nb^{3+}$—$Pr^{3+}$ co-doped ZBLANP glass excited with 796 nm photons. The spectral features within the 450–650 nm range coincide with the energy levels of $Pr^{3+}$ alone, while the rest of the spectrum belongs mainly to $Nd^{3+}$.

Of particular interest here are the blue colour 480 nm line and the red colour 635 nm line. The red transition at 635 nm has been made to lase before in a singly doped $Pr^{3+}$: ZBLANP fibre. On the other hand, the blue transition at 480 nm is new, resulting from the upconversion and resonant energy transfer excitation process. The previously observed blue lasing line was 491 nm, also in singly doped $Pr^{3+}$: ZBLANP fibre.

It is noted that lasing is also achieved at about 0.87 µm and 1.05 µm, the strong optical transitions of $Nd^{3+}$.

Figure 5:
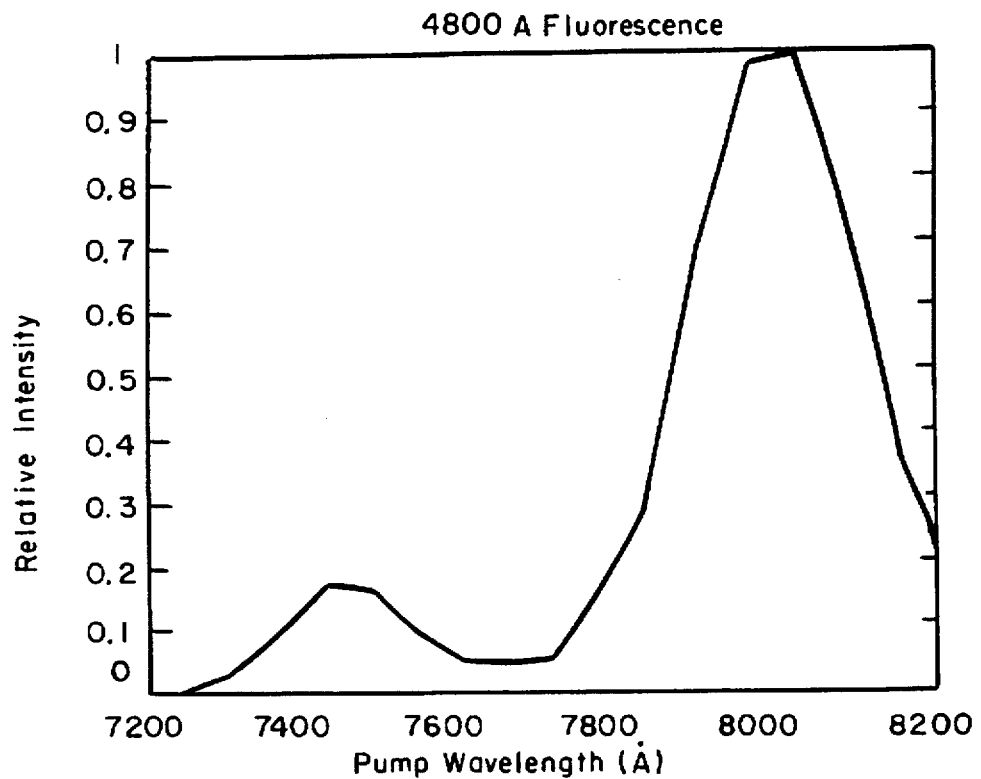
FIG. 5 shows the relative intensity of 480 nm light as a function of excitation wavelength for $Nd^{3+}$—$Pr^{3+}$ co-doped ZBLANP glass.
Figure 6:
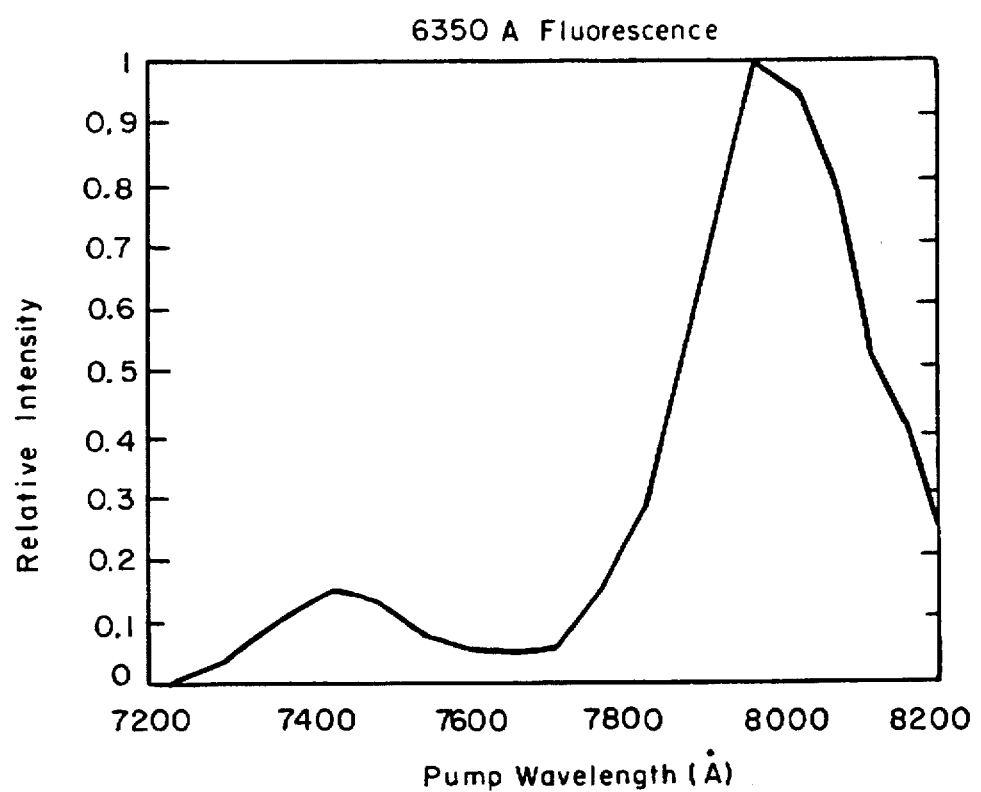
FIG. 6 shows the relative intensity of 635 nm light as a function of excitation wavelength for $Nd^{3+}$—$Pr^{3+}$ co-doped ZBLANP glass.
Figure 7:
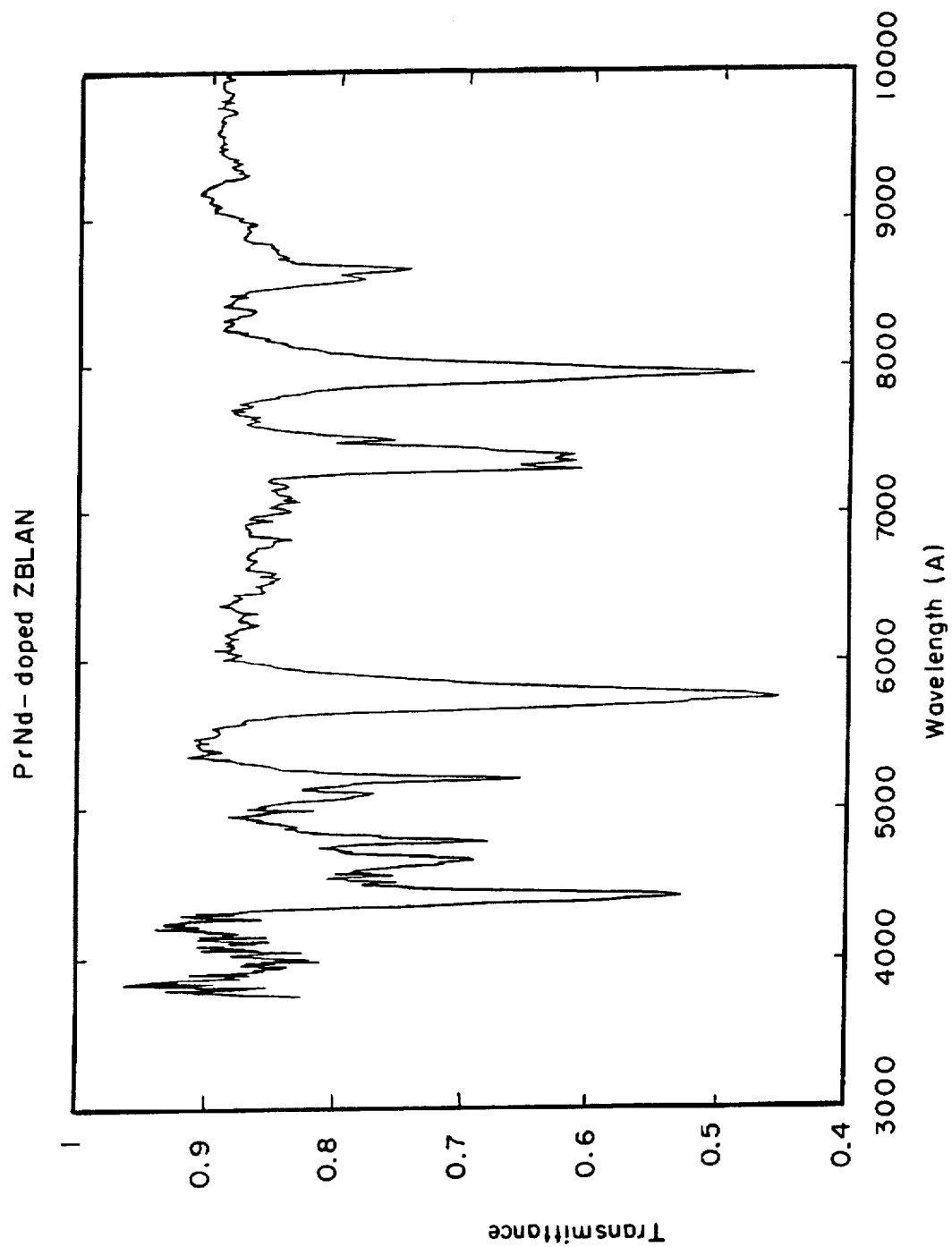
FIG. 7 shows the absorption spectrum in the visible and near infrared range for a $Nd^{3+}$—$Pr^{3+}$ doped ZBLANP glass.

The influence due to different excitation wavelengths around 0.8 µm on the intensity of the emitted light has also been investigated. This will enable the most efficient excitation wavelength to be selected. FIGS. 5 and 6 show the relative intensity of 480 nm and 635 nm light, respectively, as a function of excitation wavelengths. It is apparent that a broad range of station wavelengths around 0.8 µm can be used, with the most efficient one being 797 nm FIG. 7 which is an absorption spectrum of $Nd^{3+}$—$Pr^{3+}$ co-doped ZBLANP glass provides information about which wavelengths are the best to use as pump wavelengths. Any wavelength having a low transmittance in FIG. 7 can be used as a pump wavelength. The spectrum also shows that light of 480 nm wavelength has a high transmittance, that is, light at that wavelength does not get absorbed by the glass. This indicates that the efficiency of lasing at 480 nm is not diminished by reabsorption.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

I claim:

1. An optical material capable of emitting visible light which comprises a host matrix doped with an optical atom pair or ion pair, each pair comprising an activator and $Nd^{+3}$ which functions as a sensitiser, said sensitiser being capable of absorbing optical excitation energy of a single wavelength and transferring this optical excitation energy to said activator so as to cause the emission of visible light when the activator relaxes back into any of its lower energy states.

2. An optical material as claimed in claim 1, wherein the host matrix is a glass.

3. An optical material as claimed in claim 2, wherein the glass is a fluoride-based glass, an oxide-based glass or a chalcogenide glass.

4. An optical material as claimed in claim 3, wherein the fluoride-based glass is a heavy metal fluoride glass or a fluorozirconate glass.

5. An optical material as claimed in claim 4, wherein the fluorozirconate glass is ZBLANP.

6. An optical material as claimed in claim 3, wherein the oxide-based glass is phosphate glass or silica glass.

7. An optical material as claimed in any one of the preceding claims 1–6, wherein the activator is a rare-earth metal ion.

8. An optical material as claimed in claim 7, wherein the optical ion pair is $Nd^{3+}$—$Pr^{3+}$, $Nd^{3+}$—$Sm^{3+}$ or $Nd^{3+}$—$Tm^{3+}$.

9. An optical material as claimed in claim 1, wherein the ratio of the sensitiser to the activator is in the range of 0.5:1 to 20:1.

10. An optical material as claimed in claim 1, wherein the ratio of the sensitiser to the activator is 1:1.

11. An optical material as claimed in claim 1, wherein the wavelength of the optical excitation energy is in the 0.8 µm region.

12. An optical device comprising the optical material of claim 1.

13. An optical device as claimed in claim 12 which is a visible light source.

14. An optical device as claimed in claim 13, wherein the visible light source is a blue laser.

15. An optical waveguide or optical fibre comprising the optical material of claim 1.

16. An optical fibre as claimed in claim 15 which comprises a core composed of the optical material and a cladding surrounding the core.

17. An optical fibre as claimed in claim 16, wherein the cladding is a glass comprising $ZrF_4(53)+BaF_2(20)+LaF_3(4)+AlF_3(3)+NaF(20)$ wherein the numbers in brackets are in mol %.

18. A method for generating visible light which comprises subjecting an optical material as claimed in claim 1 to optical excitation energy of a single wavelength such that the optical excitation energy is absorbed by the sensitiser and then transferred to the activator so as to cause the emission of visible light when the activator relaxes back into any of its lower energy states.

19. An apparatus for generating visible light which comprises an optical material as claimed in claim 1.

20. An optical fibre as claimed in claim 16, wherein the cladding is a glass comprising $ZrF_4(53)+BaF_2(20)+LaF_3(4)+AlF_3(3)+NaF(20)$, wherein the numbers in brackets are in mol %.

21. An apparatus as claimed in claim 19, further comprising means for generating and directing optical excitation energy of a predetermined wavelength to said material.

* * * * *

UNITED STATES PATENT AND TRADEMARK OFFICE
CERTIFICATE OF CORRECTION

PATENT NO. : 5,754,570
DATED : May 19, 1998
INVENTOR(S) : Seng Chow Goh

It is certified that error appears in the above-identified patent and that said Letters Patent is hereby corrected as shown below:

Col. 1, line 26 - delete "dose" and substitute -- close --

Col. 1, line 51 - delete "see" and substitute -- single --

Col. 2, line 51 - delete "Trhe" and substitute -- The --

Col. 3, line 32 - delete "venous" and substitute -- various --

Col. 4, line 1 - delete "herein" and substitute -- wherein --

Col. 4, line 13 - delete "doped" and substitute -- co-doped --

Col. 4, line 37 - delete "to" and substitute -- two --

Col. 5, line 22 - after "forward" insert -- exercise --

Col. 5, line 51 - delete "station" and substitute -- excitation --

Signed and Sealed this

Eighth Day of September, 1998

Attest:

BRUCE LEHMAN

Attesting Officer     Commissioner of Patents and Trademarks